United States Patent [19]

Sapienza et al.

[11] Patent Number: 4,476,103

[45] Date of Patent: Oct. 9, 1984

[54] CATALYTIC PRODUCTION OF METAL CARBONYLS FROM METAL OXIDES

[75] Inventors: Richard S. Sapienza, Shoreham; William A. Slegeir, Hampton Bays; Michael T. Foran, Rocky Point, all of N.Y.

[73] Assignee: The United States of America as represented by the United States Department of Energy, Washington

[21] Appl. No.: 568,762

[22] Filed: Jan. 6, 1984

[51] Int. Cl.$^3$ .............................................. C01G 1/04
[52] U.S. Cl. ................................................... 423/417
[58] Field of Search ...................................... 423/417

[56] References Cited

U.S. PATENT DOCUMENTS

| | | | |
|---|---|---|---|
| 2,267,099 | 12/1941 | Hellriegel | 423/417 |
| 2,554,194 | 5/1951 | Hurd | 423/417 |
| 2,952,523 | 9/1960 | Podall | 423/417 |
| 2,952,524 | 9/1960 | Podall | 423/417 |
| 3,100,687 | 8/1963 | Wotiz | 423/417 X |
| 3,725,543 | 4/1973 | Reisch | 423/417 |
| 3,964,387 | 12/1960 | Podall et al. | 423/417 |

OTHER PUBLICATIONS

Hagen, et al., "High-Pressure Reactions of Small Covalent Molecules, Synthesis of Transition-Metal Cabonyls from Metal Oxides", Inorganic Chemistry, 17, No. 5, 1369, (1978).

Zelikman, et al., "The Reduction of Carbon of Kinetics of Calcium and Molybdate and an Isomorphous Mixture of These", Izv. Akad. Nauk SSSR, Neorgan. Mater., 2, 2204, (1966).

*Primary Examiner*—G. L. Kaplan
*Assistant Examiner*—Nam X. Nguyen
*Attorney, Agent, or Firm*—Margaret C. Bogosian; Paul A. Gottlieb; Michael F. Esposito

[57] ABSTRACT

This invention relates to the formation of metal carbonyls from metal oxides and specially the formation of molybdenum carbonyl and iron carbonyl from their respective oxides. Copper is used here in admixed form or used in chemically combined form as copper molybdate. The copper/metal oxide combination or combined copper is utilized with a solvent, such as toluene and subjected to carbon monoxide pressure of 25 atmospheres or greater at about 150°–260° C. The reducing metal copper is employed in catalytic concentrations or combined concentrations as $CuMoO_4$ and both hydrogen and water present serve as promoters. It has been found that the yields by this process have been salutary and that additionally the catalytic metal may be reused in the process to good effect.

12 Claims, No Drawings

CATALYTIC PRODUCTION OF METAL CARBONYLS FROM METAL OXIDES

BACKGROUND AND GENERAL DESCRIPTION

The invention described herein was made or conceived in the course of, or under contract with, the U.S. Department of Energy.

This invention relates to the formation of metal carbonyls from metal oxides and specifically the formation of molybdenum carbonyl and iron carbonyl from their respective oxides. Copper metal is used catalytically here in admixed form or used in chemically combined form, as copper molybdate as the reducing metal or catalyst. The copper reducing metal/metal oxide combination or combined copper is utilized with a solvent, such as toluene and subjected to carbon monoxide pressure of 25 atmospheres or greater, i.e., 25-100 atm. (preferred 80-100 atm.) at about 150°-260° C. (preferred 200°-260° C.). The reducing metal copper is employed in catalytic concentrations or combined concentrations as $CuMoO_4$ and both hydrogen and water present serve as promoters. It has been found that the yields by this process have been salutary and that additionally the catalytic metal may be reused in the process to good effect.

The reduction of metal oxides alone is very difficult and the presence of a reducing metal, copper as free metal or as copper molybdate, as in this invention facilitates the reduction of the metal oxides. This reduction is promoted further by the employment of hydrogen and/or water present and the reduction is made to the metal carbonyl and not to the pure metal.

The metal oxide employed is preferably of molybdenum and the product produced by the process is preferably $Mo(CO)_6$, which will be the carbonyl of choice where a molybdenum oxide is reduced. In the case of iron, it is possible to produce $Fe(CO)_5$, $Fe_2(CO)_9$, or $Fe_3(CO)_{12}$ using iron oxide. For the starting material in the case of molybdenum oxide, one may use the dioxide $MoO_2$, the trioxide VI $MoO_3$ or the sesquioxide III $Mo_2O_3$. The copper utilized in catalytic concentrations is used admixed with the oxide or may be used in the form of copper molybdate. Copper metal is preferably used in a particulate or powder form, such as copper dust.

In previous preparation processes, the use of high temperature and high pressure of carbon monoxide were required and the percentage conversion was very small except when extremely high pressures were utilized (Table 1). Such high pressure technology is extremely costly to operate.

TABLE 1

Carbonylation of Molybdenum (VI) Oxide

| P, atm | T, °C. | Conversion, % | P, atm | T, °C. | Conversion, % |
|---|---|---|---|---|---|
| 550 | 185 | 5 | 3640 | 140 | 0 |
| 1300 | 195 | 5 | 2175 | 160 | 0 |
| 750 | 240 | 5 | 540 | 185 | 0 |
| 130 | 285 | 5 | 100 | 210 | 0 |
| 2000 | 300 | 89 | 400 | 235 | 0 |
| 750 | 350 | 11 | 275 | 360 | 0 |
| 1350 | 400 | 81 | | | |

In the present comparison there was used copper chemically combined with the oxide in the form of copper molybdate. At comparable pressures and temperatures (88.4 atm, 235° C. versus 100 atm, 210° C.) and using toluene as a solvent a percent conversion of 9.4% was obtained whereas there was no carbonyl in previous experiments.

The present invention utilizes preferred temperature parameters of about 200°-260° C. and a pressure parameter of CO of about 80-100 atmospheres in the presence of promoters of $H_2$ and $H_2O$ in the system.

TABLE 2

Carbonylation of Copper Molybdate

| Substrate | Solvent | Pressure (ATM) | Temp (°C.) | Time (Hr) | mmoles Prod | % Yield |
|---|---|---|---|---|---|---|
| 1 g $CuMoO_4$ | 100 ml Toluene | 88.4 | 230 | 24 | .40 | 8.95 |
| 1 g $CuMoO_4$ | 300 ml Toluene | 88.4 | 235 | 25 | .42 | 9.4 |
| 1 g $CuMoO_4$ (commercial) | 100 ml Toluene | 88.4 | 250 | 63 | .40 | 9.0 |
| 1 g $CuMoO_4$ | 100 ml Toluene .3 ml $H_2O$ | 88.4 | 240 | 24 | .90 | 20.2 |
| 1 g $CuMoO_4$ (commercial) | 100 ml Toluene 1.5 ml $H_2O$ | 85.0 | 240 | 28 | .80 | 17.8 |
| 1 g $CuMoO_4$ | 100 ml Toluene | 78.2 CO 10.2 $H_2$ | 240 | 24 | 1.20 | 26.9 |
| 1 g $CuMoO_4$ | 100 ml Toluene .3 ml $H_2O$ | 78.2 CO 10.2 $H_2$ | 235 | 24 | .90 | 20.2 |

The data of Table 2, especially Runs 4, 5 and 7, show the advantage of the addition of water to the system and Runs 6 and 7 show the advantage of hydrogen.

Table 2 shows carbonylation of copper molybdate where the copper catalyst is utilized in combined form with molybdenum oxide and the conversion rate evidenced by percentage yield is of interest and also the presence and absence of water is particularly evidenced. It is believed that the present conversion is affected by time (first two hours appear to be of particular importance) as well as the presence of copper, water, and hydrogen. As to the time factor, when the reaction was permitted to exceed a 24-hour standard, there was no change in the amount of carbonyl produced but when the reaction was run for only 2.5 hours, a yield of 8.1% was obtained (see Table 2), which demonstrates that much of the reaction probably takes place within the first two hours of the temperature of experimentation.

Comparing the effect of physical admixture with Table 2, copper mixed with molybdate oxide runs gave somewhat less of a yield. For example, the yield reported was 1.8% (see Table 3). This yield increased, with the addition of water, to 13.4%. The conversion of only 1.15% is achieved when carbon monoxide and hydrogen are used with the molybdenum oxide without the use of copper; molybdenum oxide, in the absence of Cu, $H_2$, $H_2O$, affords only a trace of the desired carbonyl product.

TABLE 3
Other Carbonylations

| Catalyst | Solvent | Pressure (ATM) | Temp (°C.) | Time (Hr) | MMoles Prod | % Yield |
|---|---|---|---|---|---|---|
| 1 g($MoO_3$ + Cu) mixed | 100 ml Toluene | 83 CO | 230 | 24 | .08 | 1.8 |
| 1 g($MoO_3$ + Cu) mixed | 100 ml Toluene .3 ml $H_2O$ | 83 CO | 300 | 32 | .60 | 13.4 |
| 1 g $MoO_3$ | 100 ml Toluene | 78.2 CO 10.2 $H_2$ | 240 | 24 | .08 | 1.15 |

EXAMPLES

The reactions were carried out in a 1 liter Parr High Pressure Rocker Type Reactor. A glass liner was used in order to simplify solid recovery. The catalyst, along with the solvent, was placed in the glass liner and was sealed inside the reactor. The reactor was then purged three times with 300 to 350 psi carbon monoxide. This procedure was carried out to assure the purity of the gas in the reactor. The reactor was then pressurized from a type A cylinder of carbon monoxide. The reaction was allowed to run at 200°–260° C. for a minimum of twenty-four hours in most cases and then cooled to room temperature.

After the reactor had cooled to room temperature, the gas was tested for gas phase concentrations of hydrogen, carbon monoxide, carbon dioxide, methane, ethane, and ethylene. The quantity of molybdenum hexacarbonyl produced was analyzed using infrared spectroscopy. A known concentration of molybdenum carbonyl was prepared and the solution obtained after filtering through diatomaceous earth was run against it. The known concentration was diluted until it matched the reaction solution. This work was carried out on a Perkin-Elmer 467.

EXAMPLE 1-A

Preparation of copper molybdate. 87.5 ml of 30% hydrogen peroxide was added to 350 ml of water and then 805 g of ammonium molybdate was added. After dissolving, 908 g of copper acetate was added slowly to the stirring solution until a gray mass formed (20–30 minutes). The solution was decanted off and the mass was heated at 120° C. for two hours, ground to a fine powder and heated at 450° C. for two hours to produce one kilogram of copper molybdate ($CuMoO_4$).

EXAMPLE 1-B 1 g of molybdenum oxide or molybdenum and copper molybdate was placed in a 1 liter Parr autoclave with a glass liner in toluene (100 ml). The total cold pressure of 90 atm (CO+$H_2$) was utilized at 240° C. for about 2 hours and a yield of molybdenum carbonyl was measured which was similar to Run No. 2, Table 2.

We claim:

1. A catalytic or stoichiometric process for producing a carbonyl from an oxide selected from molybdenum and iron in the presence of copper as free metal, oxide, or chemically combined, which comprises reacting said molybdenum or iron oxide with CO at about 25 atm. or greater and about 150°–260° C. and recovering carbonyl.

2. The process according to claim 1 wherein the temperature is about 200°–260° C.

3. The process according to claim 1 wherein the oxide and copper, or copper oxide, are in the form of an admixture and the copper is used in stoichiometric or catalytic amounts.

4. The process according to claim 1 wherein the molybdenum or iron oxide and copper are chemically combined in the form of copper molybdate or copper ferrate.

5. The process according to claim 1 wherein the reaction is conducted in an aromatic solvent.

6. The process according to claim 1 wherein the copper in catalytic concentrations is reused in the process.

7. A catalytic or stoichiometric process for producing a carbonyl from an oxide selected from molybdenum and iron in the presence of copper as free metal, oxide, or chemically combined, which comprises reacting said molybdenum or iron oxide with CO at about 25 atm. or greater and about 150°–260° C. in the presence of $H_2$ promoter and recovering carbonyl.

8. A catalytic or stoichiometric process for producing a carbonyl from an oxide selected from molybdenum and iron in the presence of copper as free metal, oxide, or chemically combined, which comprises reacting said molybdenum or iron oxide with CO at about 25 atm. or greater and about 150°–260° C. in the presence of $H_2O$ promoter and recovering carbonyl.

9. The process according to claim 8 wherein the reaction is conducted in an aromatic solvent.

10. A catalytic or stoichiometric process for producing a carbonyl from an oxide selected from molybdenum and iron in the presence of copper as free metal, oxide, or chemically combined, which comprises reacting said molybdenum or iron oxide with CO at about 25 atm. or greater and about 150°–260° C. in the presence of $H_2$ and $H_2O$ promoters and recovering carbonyl.

11. The process according to claim 5 wherein the reaction is conducted in an aromatic solvent.

12. The process according to claim 10 wherein the temperature is about 200°–260° C.

* * * * *